US012506992B2

(12) United States Patent
Machida

(10) Patent No.: US 12,506,992 B2
(45) Date of Patent: Dec. 23, 2025

(54) ELECTROACOUSTIC TRANSDUCER AND MOUNTING STRUCTURE OF SAME

(71) Applicant: Foster Electric Company, Limited, Tokyo (JP)

(72) Inventor: Kentaro Machida, Tokyo (JP)

(73) Assignee: Foster Electric Company, Limited, Tokyo (JP)

( * ) Notice: Subject to any disclaimer, the term of this patent is extended or adjusted under 35 U.S.C. 154(b) by 185 days.

(21) Appl. No.: 18/326,413

(22) Filed: May 31, 2023

(65) Prior Publication Data

US 2023/0388686 A1 Nov. 30, 2023

(30) Foreign Application Priority Data

May 31, 2022 (JP) ................................ 2022-089027

(51) Int. Cl.
*H04R 1/02* (2006.01)
*H04R 1/44* (2006.01)

(52) U.S. Cl.
CPC ............... *H04R 1/025* (2013.01); *H04R 1/44* (2013.01)

(58) Field of Classification Search
CPC ...... H04R 2499/13; H04R 5/02; H04R 1/025; H04R 1/02; B60R 11/0217; B60R 13/0237
See application file for complete search history.

(56) References Cited

U.S. PATENT DOCUMENTS

| | | | | |
|---|---|---|---|---|
| 8,139,783 B2 * | 3/2012 | Schuster | ............. | B60R 13/0237 381/86 |
| 2014/0334638 A1 * | 11/2014 | Barksdale | ............ | H04R 29/002 381/86 |
| 2015/0098586 A1 * | 4/2015 | Tanabe | ................. | H04R 1/2849 381/86 |

FOREIGN PATENT DOCUMENTS

| | | |
|---|---|---|
| JP | H633745 Y2 | 8/1994 |
| JP | 09-37371 A | 2/1997 |
| JP | 2000-152395 A | 5/2000 |

OTHER PUBLICATIONS

Japanese Patent Office; Notice of Reasons for Refusal for Japanese Patent Application No. 2022-089027; Aug. 22, 2023; entire document.

* cited by examiner

*Primary Examiner* — Kile O Blair
(74) *Attorney, Agent, or Firm* — Allen, Dyer, Doppelt & Gilchrist, P.A.

(57) ABSTRACT

Provided is an electroacoustic transducer capable of improving the reliability of a drive circuit and the sound quality. The electroacoustic transducer includes: a vibration unit constituting a part of a partition defining a cabin space of a vehicle; a magnetic circuit on an outside of the cabin space; and an electrical element configured to process an electrical signal for vibrating the vibration unit. The electrical element is located in the cabin space.

12 Claims, 7 Drawing Sheets

ELECTROACOUSTIC TRANSDUCER AND MOUNTING STRUCTURE OF SAME

CROSS-REFERENCE TO RELATED APPLICATIONS

This application claims the benefit of Japanese Patent Application No. JP 2022-089027, filed on May 31, 2022, the contents of which application is herein incorporated by reference in its entirety.

BACKGROUND OF THE INVENTION

The present disclosure relates to an on-vehicle electroacoustic transducer and a structure for mounting the electroacoustic transducer.

Electroacoustic transducers, what are called "speakers," for reproducing sound by vibrating a diaphragm are widely used to reproduce sound, such as music or sound, in a cabin of a vehicle, such as an automobile. Japanese Unexamined Patent Publication No. H9-37371 describes placing a speaker on the interior side of a vehicle door.

Speakers are often mounted on a vehicle as follows. A plurality of speakers including tweeters for reproducing high-pitched sound and woofers for reproducing low-pitched sound in combination (see Japanese Unexamined Patent Publication No. H9-37371). In a 2-way or 3-way method of connecting a plurality of speakers to a single amplifier (i.e., channel), the sound field is adjusted by interposing a low or high pass filter between the amplifier and each speaker to change the combined impedance of the speakers. The filter is configured by combining a coil, a capacitor, and a resistor. Japanese Unexamined Patent Publication No. 2000-152395 describes forming a mount integrally with a frame of a speaker, and fitting a filter capacitor to the mount.

SUMMARY OF THE INVENTION

A vehicle door with a movable window has however the following problem. Rainwater or other moisture may enter the inside of the door frame and reach a filter capacitor in a drive circuit of a speaker in the vehicle door, which reduces the reliability of the electrical circuit that vibrates the vibration unit of the speaker.

The present disclosure was made to solve such the problem. The objective of the present disclosure is to provide an electroacoustic transducer capable of improving the reliability of the electrical circuit of the driver and the sound quality.

The present disclosure was made to solve at least part of the problem described above and implemented in the following aspects.

An electroacoustic transducer according to this aspect includes: a vibration unit constituting a part of a partition defining a cabin space of a vehicle; a magnetic circuit on an outside of the cabin space; and an electrical element configured to process an electrical signal for vibrating the vibration unit. The electrical element is located in the cabin space.

In a mounting structure of an electroacoustic transducer according to this aspect, the electroacoustic transducer is inserted into a hole of the partition and connected to the partition in a watertight manner.

The electroacoustic transducer according to the present disclosure with the means described above can improve the reliability of the electrical circuit of the driver and the sound quality.

DETAILED DESCRIPTION OF PREFERRED EMBODIMENTS

An embodiment of the present disclosure will be described with reference to the drawings.

Figure 1:
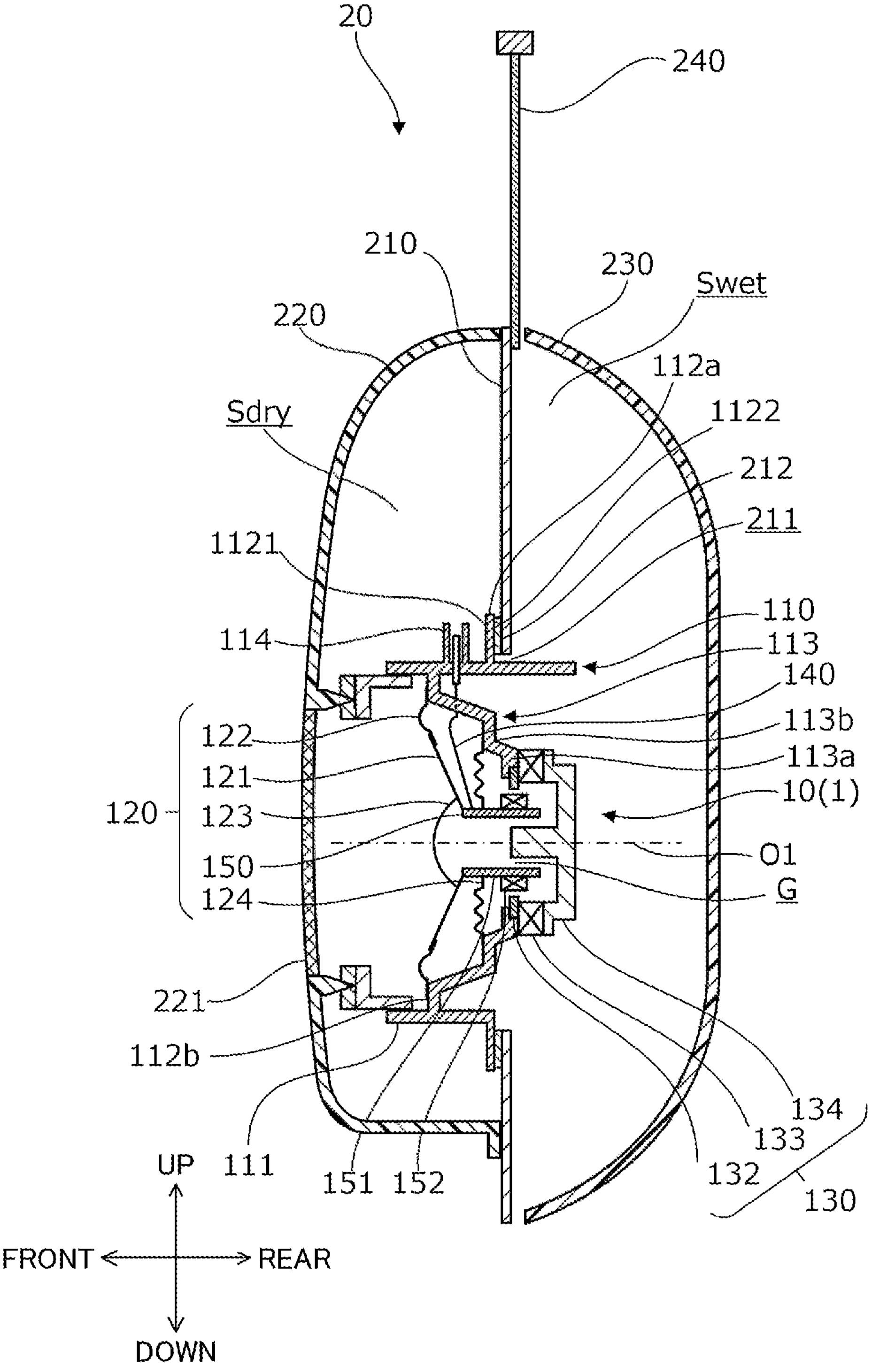
FIG. 1 is a schematic vertical cross-sectional view of a vehicle door applied with an electroacoustic transducer according to the present disclosure.

FIG. 1 is a schematic vertical cross-sectional view of a vehicle door applied with an electroacoustic transducer according to the present disclosure. Specifically, FIG. 1 shows a cross section of a side door 20 of a vehicle, the side door 20 with a speaker 10 mounted as an electroacoustic transducer 1, taken along the vertical plane passing through a center axis O1 of the speaker 10.

The electroacoustic transducer 1 according to this embodiment is, for example, the speaker unit 10 (hereinafter simply referred to as the "speaker 10") mounted in the side door 20 (hereinafter simply referred to as the "door 20") of the vehicle. FIG. 1 shows an example of the speaker 10 with main components axially symmetrical about the center axis O1 of the speaker 10 which extends along the width direction of the vehicle.

As shown in FIG. 1, the door 20 mainly includes a partition (i.e., an inner panel) 210, a lining (i.e., a door trim) 220, an outer covering (i.e., an outer panel) 230, and a window glass 240. The partition 210 extending vertically and the lining 220 closer to the vehicle cabin than the partition 210 form a vehicle interior space (i.e., a cabin space or a part of cabin) Sdry in the vehicle cabin. On the other hand, the partition 210 and the outer covering 230 closer to the outside of the vehicle than the partition 210 form a vehicle exterior space Swet. The window glass 240 is slidable in a substantial up-down direction along the partition 210 in the vehicle exterior space Swet. The upper ends of the partition 210 and the lining 220 are connected to each other in a watertight manner so that the vehicle interior space Sdry serves as a dry area not allowing the entry of moisture, such as rain water, from above. On the other hand, there is a gap between the upper ends of the partition 210 and the outer covering 230 to make the window glass 240 slidable. The vehicle exterior space Swet serves as a wet area allowing the entry of moisture, such as rain water, from above. There is also a gap between the lower ends of the partition 210 and the outer covering 230 to discharge the moisture that has entered from through the upper gap.

The speaker 10 includes a frame 110 connected to the partition 210, a vibration unit 120 connected to the frame 110, an electrical circuit 140 that transmits electrical signals for driving the vibration unit 120, and a magnetic circuit 130 including a magnetic material and/or a magnet. The frame 110 is attached to the partition 210 by a fastening member, such as a screw, with mounting seats 118 (not shown in FIG. 1) interposed therebetween, which will be described later. In the following description, the "axial" direction extends in parallel with the center axis O1. Out of the axial direction, the "forward" direction extends from the vibration unit 120 toward the vehicle cabin, and the "rearward" direction extends from the vibration unit 120 toward the outside of the vehicle. In addition, the "radial" direction is the direction of outward radiation perpendicular to the center axis O1. In the drawings, with the speaker 10 attached to the right door 20 of the vehicle, the longitudinal direction of the vehicle is indicated as the "left-right" direction of the speaker 10, while the vertical direction of the vehicle is indicated as the "up-down" direction of the speaker 10.

The speaker 10 emits sound forward from the vibration unit 120, that is, toward the vehicle cabin. The lining 220 is made of a resin, and has a hole covered with a mesh member 221 in a part corresponding to the front of the speaker 10. The speaker 10 is a woofer or a subwoofer, for example, which is capable of reproducing low sound in response to a large input.

The frame 110 includes an outer circumferential cylinder 111, an outer circumferential flange 112*a*, and an inner circumferential flange 112*b*. The outer circumferential cylinder 111 is in a cylindrical shape. The outer circumferential flange 112*a* extends in a flange shape radially outward from the outer circumferential surface of the outer circumferential cylinder 111. The inner circumferential flange 112*b* extends in a flange shape radially inward from the inner circumferential surface of the outer circumferential cylinder 111. The frame 110 also includes a connector 114 on its top part. The outer circumferential flange 112*a*, the outer circumferential cylinder 111, and the inner circumferential flange 112*b* are solid and formed integrally. As shown in FIG. 1, a lower part of the outer circumferential cylinder 111 may be cut out in the vehicle exterior space Swet. The frame 110 includes a main body 113 with a diameter gradually decreasing rearward from the inner circumferential end of the inner circumferential flange 112*b* in a cross section. The main body 113 includes an annular bottom 113*a* and a plurality of support posts (beams) 113*b*. The annular bottom 113*a* is coaxial with the center axis O1. The support posts (beams) 113*b* extend radially between the annular bottom 113*a* and the front of the inner circumferential surface of the outer circumferential cylinder 111. The rear surface of the annular bottom 113*a* is connected to the magnetic circuit 130. The frame 110 may be made of a resin or metal alone, or a resin and metal in combination.

The outer circumferential flange 112*a* has a first surface 1121 facing the vehicle cabin and a second surface 1122 facing the outside of the vehicle. The partition 210 has a partition hole 211 through which the outer circumferential cylinder 111 of the speaker 10 is to be inserted. The outer circumferential flange 112*a* has a larger outer diameter than the diameter of the partition hole 211. The second surface 1122 is connected in a watertight manner to the partition 210, radially outside the partition hole 211 and on the cabin side, via an annular seal member 212. That is, the outer circumferential flange 112*a* is connected in a watertight manner to the partition 210.

The vibration unit 120 includes a diaphragm 121, an edge 122, a center cap 123, a damper 124, and a voice coil 150. The voice coil 150 vibrates in the axial direction. That is, the vibration unit 120 vibrates in the axial direction. The diaphragm 121, the edge 122, and the center cap 123 are made of a waterproof material.

The diaphragm 121 is a sound emitting member in a cone-shape having, at its center, a circular hole coaxial with the center axis O1, and extending radially outward and forward from the inner circumferential edge of the circular hole. The diaphragm 121 is connected to the voice coil 150. The edge 122 is in an annular shape forming a recess with an inverted U-shaped cross section, for example. The edge 122 has an inner circumferential edge connected to the outer circumferential edge of the diaphragm 121, and an outer circumferential edge connected to the front surface of the inner circumferential flange 112*b* of the frame 110. The center cap 123 is a sound emitting member with an outer circumferential edge connected to a part of the top (front surface) of the diaphragm 121 so as to cover the circular hole of the diaphragm 121. That is, the vibration unit 120 is connected to the frame 110 in a watertight manner. Accordingly, the vibration unit 120 constitutes a part of the partition 210, while separating the vehicle interior space Sdry from the vehicle exterior space Swet in a watertight manner. The damper 124 couples the voice coil 150 and the frame 110 and supports the voice coil 150 vibratably along the center axis O1.

The magnetic circuit 130 includes a top plate 132, a magnet 133, and a bottom plate (yoke) 134, and is located at the center of the speaker 10 and behind the vibration unit 120. That is, the magnetic circuit 130 is located in the vehicle exterior space Swet (i.e., outside the vehicle cabin). The top plate 132 and the bottom plate 134 are magnetic members, and the magnet 133 is, for example, a permanent magnet magnetized axially. The ring-shaped magnet 133 and the ring-shaped top plate 132 are stacked on the outer circumferential edge of the front surface of the bottom plate 134. In addition, the bottom plate 134 has a center cylinder extending forward at the center of the front surface. A gap is left between the top plate 132 and the center cylinder of the bottom plate 134 to serve as a magnetic gap G.

The voice coil 150 includes a cylindrical bobbin 151 coaxial with the center axis O1 and a coil 152 wound around the outer circumferential surface of the bobbin 151. The coil 152 is located in the magnetic gap G. The coil 152 constitutes a part of the electrical circuit 140 to which electrical signals for axially driving (vibrating) the voice coil 150 are applied. Details of the electrical circuit 140 will be described later.

Figure 2:
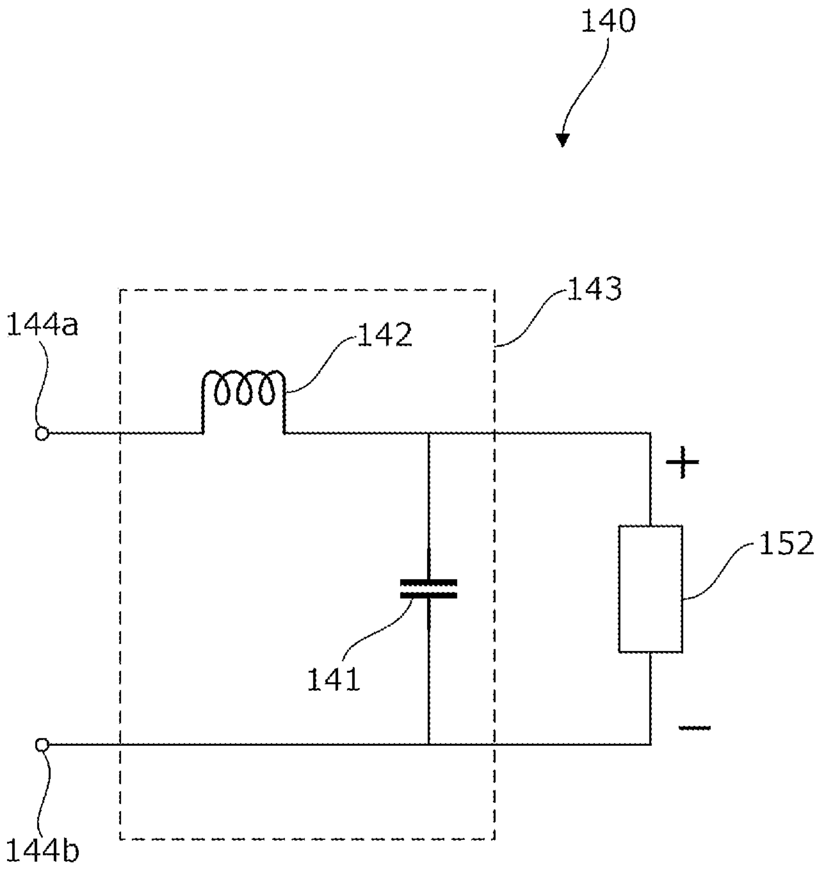
FIG. 2 is a circuit diagram of an electrical circuit of the electroacoustic transducer.
Figure 3:
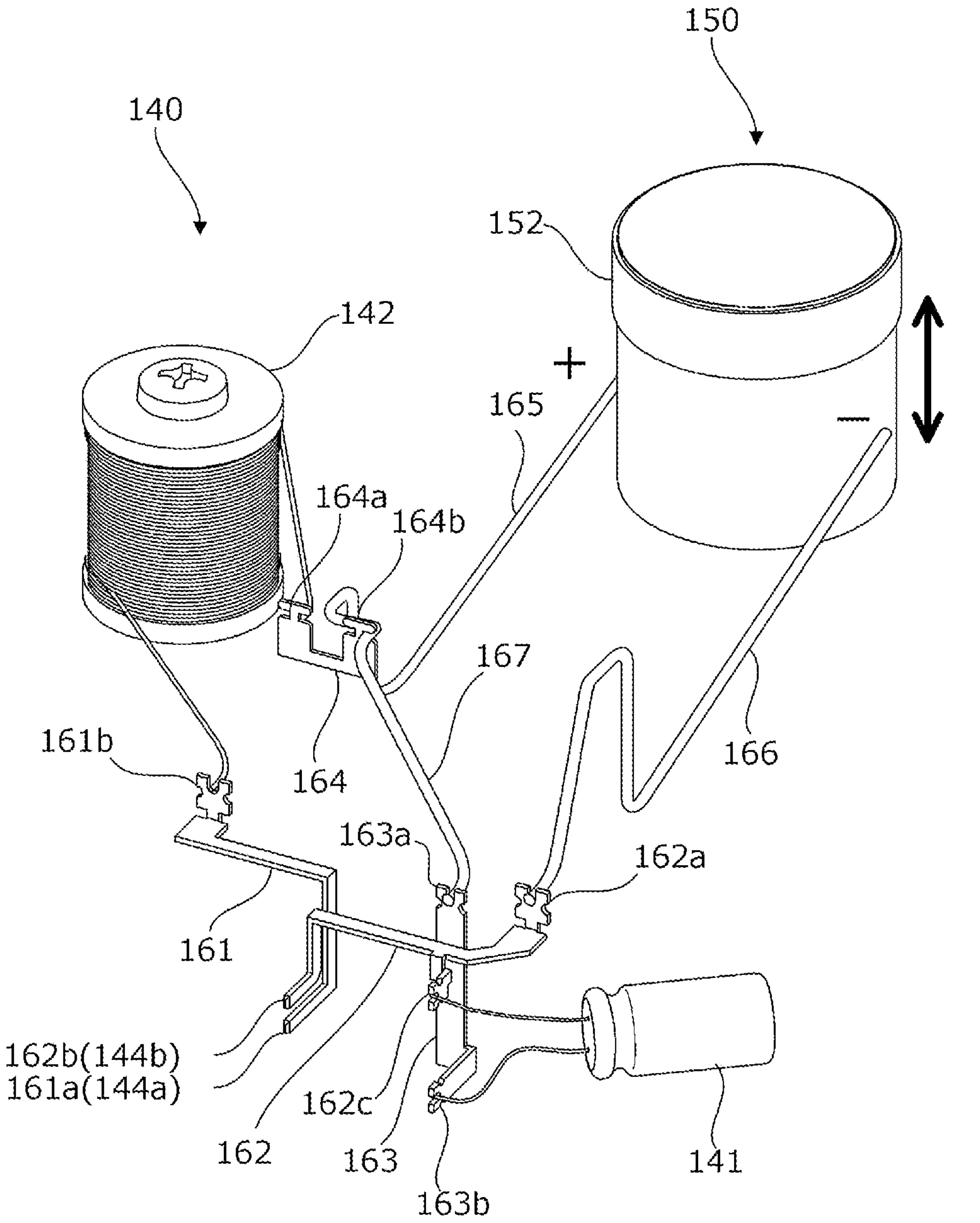
FIG. 3 is a schematic diagram showing configurations and arrangement of electrical elements of the electrical circuit of the electroacoustic transducer.

FIG. 2 is a circuit diagram showing a drive circuit of the electroacoustic transducer. Specifically, the figure is a circuit diagram of the electrical circuit 140 to which electrical signals for vibrating the voice coil 150 are applied. FIG. 3 is a schematic diagram showing actual configurations and arrangement of electrical elements of the electrical circuit of the electroacoustic transducer.

As shown in in FIG. 2, the electrical circuit 140 is connected to the coil 152, a capacitor 141, and an inductor 142 as electrical elements. The capacitor 141 is electrically connected in parallel with the coil 152. The inductor 142 is electrically connected in series with the coil 152. The electrical circuit 140 includes a pair of terminals 144*a* and 144*b* through which electrical signals for vibrating the voice coil 150 are input. The capacitor 141 and the inductor 142 constitute a filter 143 that functions as a filter for processing the input electrical signals.

Next, actual configuration, arrangement, and connection relationship of the electrical circuit 140 will be described with reference to FIG. 3. In the electrical circuit 140, the capacitor 141, the inductor 142, and the coil 152 are electrically connected by lug plates 161, 162, 163, and 164 and lead wires 165, 166, and 167, which are conductive members that conduct electricity.

Specifically, the coil 152 shown in FIGS. 2 and 3 has a positive (+) terminal connected to one end of the lead wire 165, and a negative (−) terminal connected to one end of the lead wire 166. The other end of the lead wire 165 is connected to one end 164*b* of the lug plate 164, and the other end of the lead wire 166 is connected to one end 162*a* of the lug plate 162. The other end 164*a* of the lug plate 164 is connected to one of a pair of lead lines of the inductor 142, and the other one of the pair of lead lines of the inductor 142 is connected to one end 161*b* of the lug plate 161. The other end 161*a* of the lug plate 161 forms the terminal 144*a* shown in FIG. 2. Similarly, the other end 162*b* of the lug plate 162 forms the terminal 144*b* shown in FIG. 2.

One end of the lead wire 167 is connected to the end 164*b* of the lug plate 164, and the other end of the lead wire 167 is connected to one end 163*a* of the lug plate 163. The other end 163*b* of the lug late 163 is connected to one of a pair of lead lines of the capacitor 141, and the other one of the pairs of lead lines of the capacitor 141 is connected to a lead-out 162*c* from an intermediate point of the lug plate 162.

Figure 4:
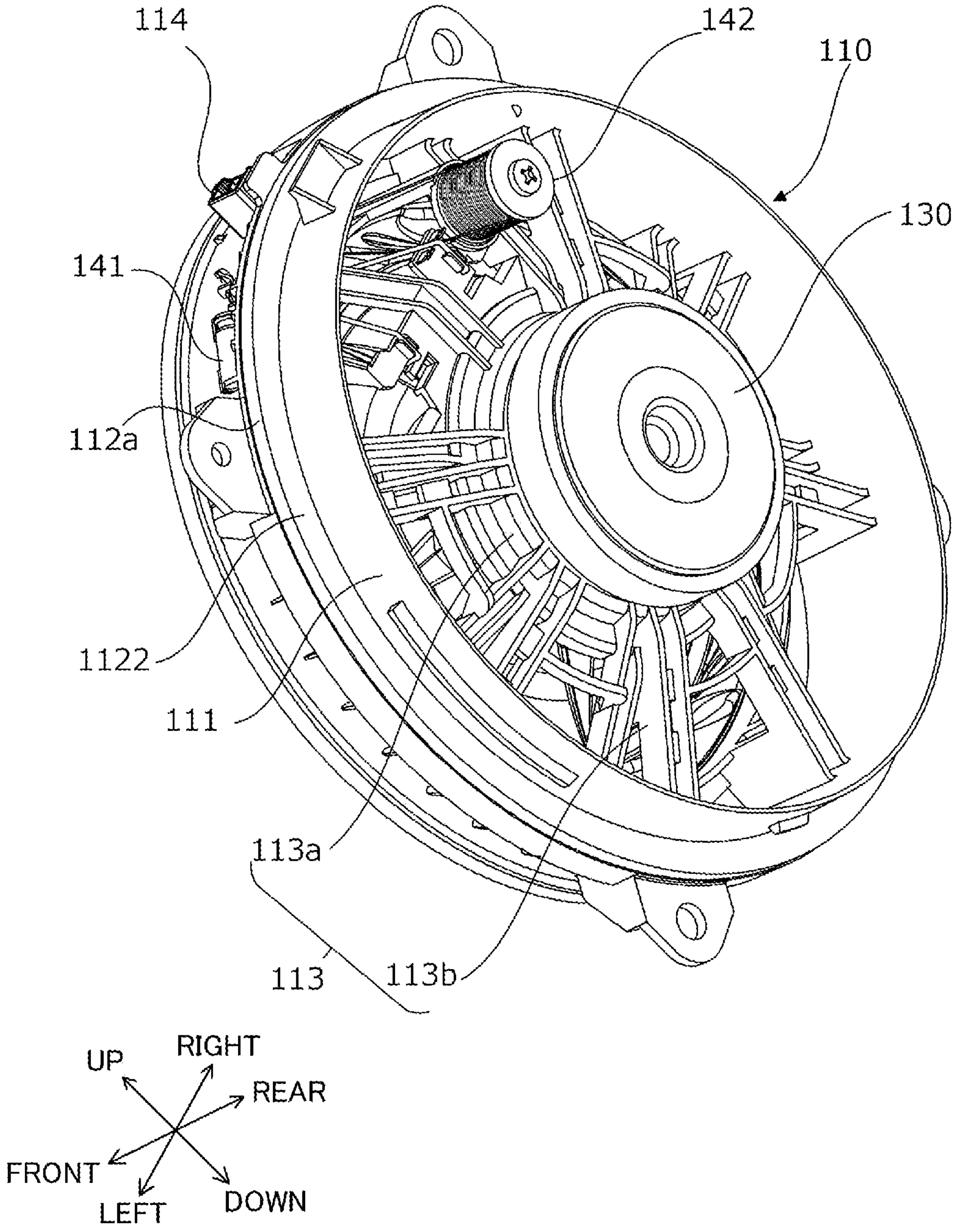
FIG. 4 is a rear perspective view showing a positional relationship among the electrical elements of the electroacoustic transducer.
Figure 5:
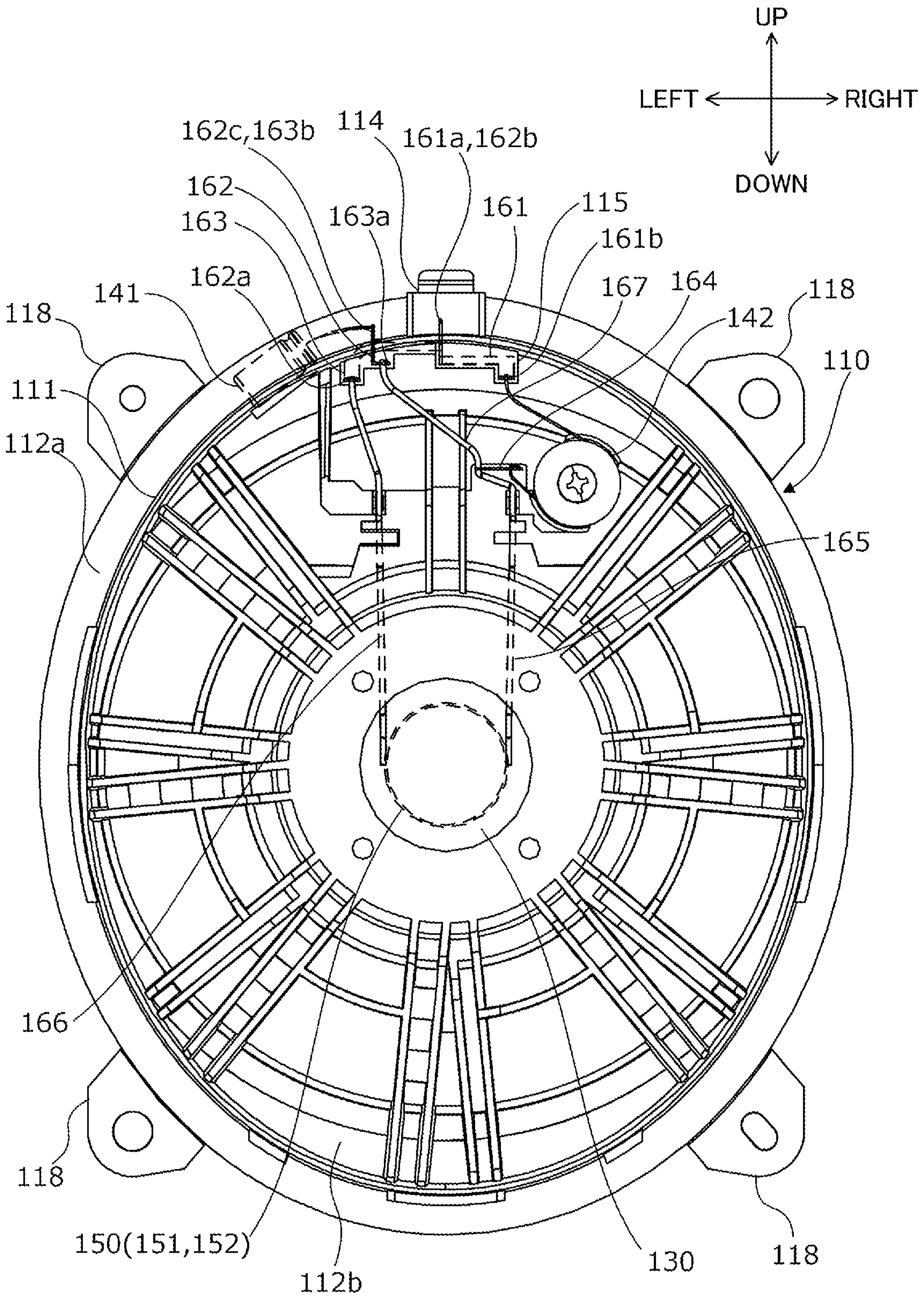
FIG. 5 is a rear view showing a positional relationship among the electrical elements and conductive members of the electroacoustic transducer.

FIG. 4 is a rear perspective view showing a positional relationship among the electrical elements of the electroacoustic transducer. FIG. 5 is a rear view showing a positional relationship among the electrical elements and the conductive members of the electroacoustic transducer.

As shown in FIGS. 4 and 5, the connector 114 and the capacitor 141 are located on the outer circumferential surface of the outer circumferential cylinder 111 in front of the outer circumferential flange 112*a*. The inductor 142, the coil 152, the lug plate 164, and the three lead wires 165, 166, and 167 are located behind the vibration unit 120 radially inward with respect to the outer circumferential cylinder 111. In this embodiment, as shown in FIG. 4, the support posts 113*b* of the frame 110 are arranged radially between the outer circumferential cylinder 111 and the annular bottom 113*a* and do not seal, as a plane, the inner side of the outer circumferential cylinder 111. Note that only one reference character 113*b* is shown as a representative in FIG. 4. Radially inside the outer circumferential cylinder 111, the vehicle exterior space Swet is located behind the vibration unit 120. That is, the vibration unit 120 is a part of the boundary defining the vehicle interior space Sdry and the vehicle exterior space Swet. The connector 114 and the capacitor 141 are located in the vehicle interior space Sdry, while the inductor 142, the coil 152, the lug plate 164, and the lead wires 165, 166, and 167 are located in the vehicle exterior space Swet.

Referring to FIG. 5, the frame 110 includes a projection 115 integrally formed on the inner circumference of the outer circumferential cylinder 111. The lug plates 161, 162, and 163 are, except for the respective ends 161*a*, 161*b*, 162*a*, 162*b*, 163*a*, and 163*b* and the lead-out 162*c*, embedded in the projection 115 by insert-molding, and penetrate the frame 110 between the vehicle interior space Sdry and the vehicle exterior space Swet (indicated by broken lines in FIG. 5). The ends 161*a*, 162*b*, and 163*b* and the lead-out 162*c* are located on the outer circumferential surface of the outer circumferential cylinder 111 in front of the outer circumferential flange 112*a*. That is, the ends 161*a*, 162*b*, and 163*b* and the lead-out 162*c* are located in the vehicle interior space Sdry. On the other hand, the ends 161*b*, 162*a*, and 163*a* are located behind the vibration unit 120 radially inward with respect to the outer circumferential cylinder 111. That is, the ends 161*b*, 162*a*, and 163*a* are located in the vehicle exterior space Swet. The lug plate 164 is located in the vehicle exterior space Swet. Accordingly, electrical signals applied to the terminals 144*a* and 144*b* pass through both the vehicle interior and exterior spaces Sdry and Swet.

Figure 6:
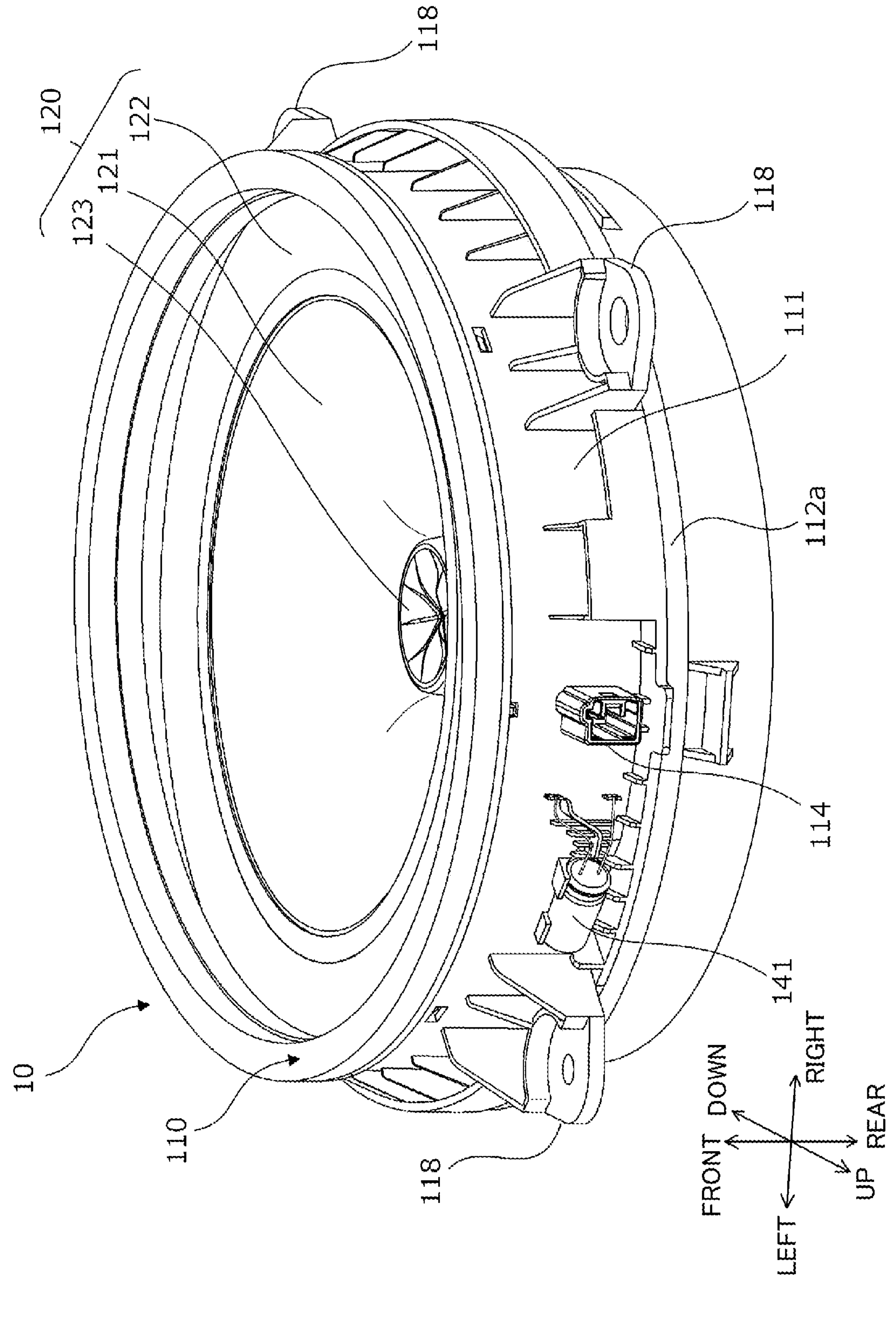
FIG. 6 is a front perspective view showing an arrangement of a connector and capacitor supports of the electroacoustic transducer.
Figure 7:
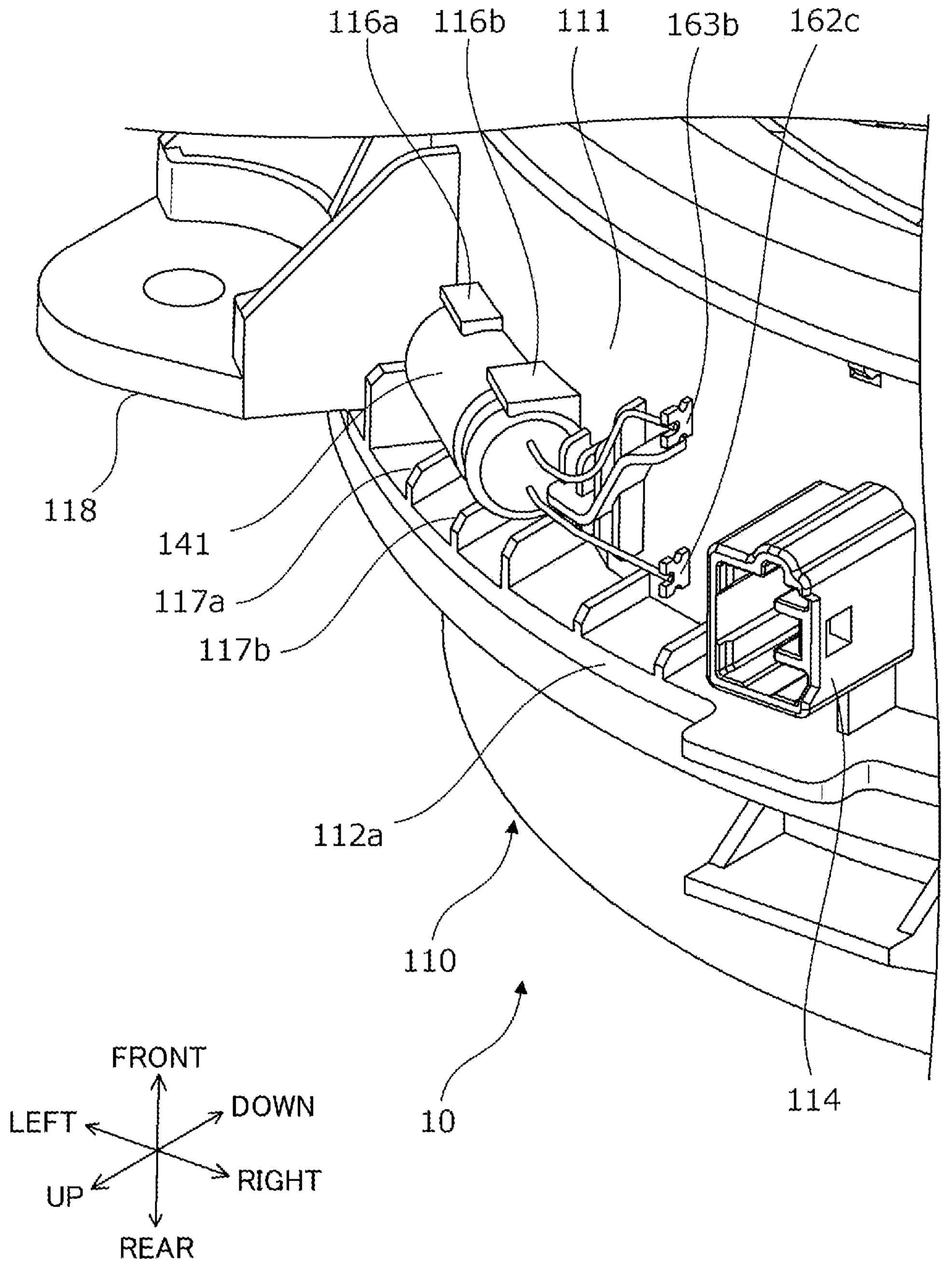
FIG. 7 is an enlarged view of the connector and capacitor supports of the electroacoustic transducer.

FIG. 6 is a front perspective view showing an arrangement of a connector and capacitor supports of the electroacoustic transducer. FIG. 7 is an enlarged view of the connector and the capacitor supports of the electroacoustic transducer.

As shown in FIGS. 6 and 7, the frame 110 includes, in front of the outer circumferential flange 112*a*, the connector 114 extending from the outer circumferential surface of the outer circumferential cylinder 111 into a tubular shape with a substantially rectangular cross section. The frame 110 also includes, in front of the outer circumferential flange 112*a* and near the connector 114, front supports 116*a* and 116*b* and rear supports 117*a* and 117*b* as examples of supports for the capacitor 141. The front supports 116*a* and 116*b* extend radially outward like ribs from the outer circumferential surface of the outer circumferential cylinder 111. The rear supports 117*a* and 117*b* extend forward like ribs from the front surface of the outer circumferential flange 112*a*. The connector 114, the front supports 116*a* and 116*b*, and the rear supports 117*a* and 117*b* extend in the same direction of mold release. The capacitor 141 is sandwiched between the front supports 116*a* and 116*b* and the rear supports 117*a* and 117*b*. The capacitor 141 is located inside the outer circumferential edge of the outer circumferential flange 112*a* when the speaker 10 is viewed in the front-rear direction. That is, the capacitor 141 does not to intersect the virtual boundary extending from the outer edge of the frame 110 in the front-rear direction (i.e., the direction of vibration). The frame 110 further includes the plurality of mounting seats 118 extending radially outward from the outer circumferential cylinder 111.

In the speaker 10 with such a configuration, the lug plates 161, 162, and 163 penetrate the frame 110 to be integral with the frame 110. Accordingly, even if the voice coil 150 is located in the vehicle exterior space Swet, a part of the electrical circuit 140 that vibrates the voice coil 150 can be located in the vehicle interior space Sdry. For example, as in this embodiment, only the capacitor 141, whose performance may be influenced by exposure to water, can be located in the vehicle interior space Sdry. That is, the electrical elements can be located in an environment more suitable for exhibiting performances and thus less damaged by the environment, which improves the reliability of the electrical circuit 140.

The capacitor 141 is sandwiched and fixed by the front supports 116*a* and 116*b* and the rear supports 117*a* and 117*b* of the frame 110 and is not moved, with respect to the frame 110, by the vibration of a traveling vehicle. The capacitor 141 is less disconnected from the lug plates 162 and 163. That is, the reliability of the electrical circuit 140 improves. In addition, not projecting from the outer edge of the frame 110, the capacitor 141 is free from careless touch when the speaker 10 is attached to the door 20, and can reduce the interference with the speaker 10 and other attachments to the door 20. Furthermore, the capacitor 141 is placed in an open space (i.e., not confined in a closed space, such as a sealed container) whereby the operation of the explosion-proof valve of the capacitor 141 is not hindered.

The capacitor 141 is placed near the connector 114, which allows for a smaller length between the end 162*b* and the lead-out 162*c* of the lug plate 162. The lug plates 161, 162, and 163 can be concentrated. Accordingly, manufacturing costs can be reduced.

The filter 143 including the capacitor 141 and the inductor 142 in the electrical circuit 140 processes electrical signals for vibrating the voice coil 150 to adjust the sound field and improve the sound quality of the speaker 10.

In this manner, the speaker 10 according to this embodiment improves the reliability of the electrical circuit 140 for vibrating the vibration unit 120 and the sound quality of the speaker 10.

While an embodiment of the present disclosure has been described above, the present disclosure is not limited to this embodiment.

For example, the place for mounting the electroacoustic transducer is not limited to a vehicle, but may be another mobile body with a partition defining a dry area and a wet area.

In the above embodiment, the rear surface of the outer circumferential flange 112*a* of the frame 110 is connected to the front surface of the partition 210 via the seal member 212. Alternatively, the front surface of the outer circumferential flange 112*a* may be connected to the rear surface of the partition 210 via the seal member 212.

In the above embodiment, the speaker 10 is mounted in the side door 20 of the vehicle, but may be mounted in a back door or any other part.

In the above embodiment, the filter 143 includes a single filter as an example, but may include a plurality of filters. In the above embodiment, the capacitor 141 of the filter 143 is connected in parallel with the coil 152, but may be connected in series with the coil 152 depending on the type of the speaker or the filtering performance.

In the above embodiment, the filter 143 includes the single capacitor 141 and the single coil 152, but may include a plurality of capacitors and a plurality of coils, or other passive or active elements, such as resistors.

In the above embodiment, the capacitor 141 has a cylindrical shape having the center axis extending along the circumference of the speaker 10, but may have another shape having the center axis extending along, for example, the direction of vibration.

In the above embodiment, the inductor 142 is located in the vehicle exterior space Swet, but may be located in the vehicle interior space Sdry. In addition, the whole of the entire filter 143 may be located in the vehicle interior space Sdry.

In the above embodiment, the vehicle interior space Sdry is defined by the vibration unit 120. Alternatively, the vehicle interior space Sdry may be defined by the frame 110 with a watertight connection secured by connecting, as a plane, the annular bottom 113*a* of the main body 113 of the frame 110 and the outer circumferential cylinder 111. In this case, the capacitor 141 may be located radially inward with respect to the inner circumferential surface of the outer circumferential cylinder 111 and radially inward with respect to the inner circumferential surface of the main body 113.

In the above embodiment, the speaker 10 is of an external magnet type as an example, but the speaker 10 may be of an internal magnet type.

What is claimed is:

1. An electroacoustic transducer for a vehicle having a partition defining an interior cabin space of the vehicle, the electroacoustic transducer comprising:

a frame having a circumferential flange extending radially outwardly and separating the frame into an interior space portion and an exterior space portion;

a vibration unit connected to the exterior space portion of the frame;

a magnetic circuit connected to the exterior space portion of the frame; and an electrical element carried by the interior space portion of the frame and configured to process an electrical signal for vibrating the vibration unit;

wherein the frame is configured to connect to the partition so that the electrical element is positioned in the interior cabin space.

2. The electroacoustic transducer of claim 1, further comprising a conductive member connected to the electrical element, wherein the conductive member penetrates the frame.

3. The electroacoustic transducer of claim 2, wherein the electrical element is fixed to the interior space portion of the frame.

4. The electroacoustic transducer of claim 2, wherein the conductive member is integral with the frame.

5. The electroacoustic transducer of claim 1, wherein the frame includes a support configured to support the electrical element.

6. The electroacoustic transducer of claim 1, wherein the electrical element does not intersect with a virtual boundary extending from an outer edge of the frame in a direction in which the vibration unit vibrates.

7. The electroacoustic transducer of claim 1, wherein the electrical element is located near a connector formed on the frame.

8. The electroacoustic transducer of claim 1, wherein the electrical element functions as a filter.

9. The electroacoustic transducer of claim 1, wherein the electrical element is a capacitor.

10. The electroacoustic transducer of claim 1, wherein the frame includes an outer circumferential cylinder configured to be connected to the partition, and the electrical element is located closer to an outer circumferential surface of the outer circumferential cylinder.

11. The electroacoustic transducer of claim 1, wherein the electrical signal passes through both sides of the partition defining the interior cabin space.

12. A mounting structure of an electroacoustic transducer, wherein the electroacoustic transducer of claim 1 is configured to be inserted into a hole of the partition and connected to the partition in a watertight manner.

* * * * *